United States Patent [19]

Sztuka

[11] Patent Number: 4,505,043

[45] Date of Patent: Mar. 19, 1985

[54] HEIGHT MEASUREMENT GAGE FOR MULTIFOCAL LENSES

[76] Inventor: Stanley Sztuka, 190-525 Riverleigh Ave., Riverhead, N.Y. 11901

[21] Appl. No.: 446,766

[22] Filed: Dec. 3, 1982

[51] Int. Cl.³ .............................................. A61B 3/10
[52] U.S. Cl. .................................... 33/174 A; 33/200; 351/228
[58] Field of Search .............. 33/200, 174 A; 351/228

[56] References Cited

U.S. PATENT DOCUMENTS

| | | | |
|---|---|---|---|
| 1,263,713 | 4/1918 | Smith | 33/200 X |
| 1,935,175 | 11/1933 | Clement | 33/200 |
| 1,981,438 | 11/1934 | Smith | 351/228 |
| 4,208,800 | 6/1980 | Grolman et al. | 33/200 |

Primary Examiner—William D. Martin, Jr.
Attorney, Agent, or Firm—Leonard Belkin

[57] ABSTRACT

A device designed to aid in fitting eyeglasses and, more particularly, bifocals and multifocals by accurately measuring the distance from the center of the pupil to the lower edge of the frame.

1 Claim, 7 Drawing Figures

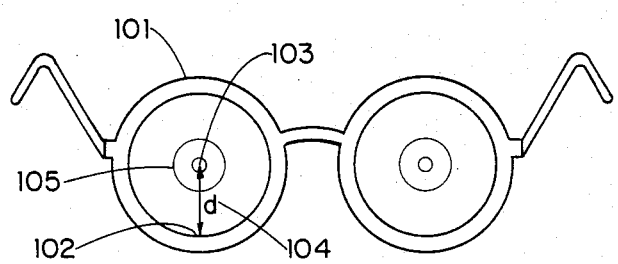
Fig. 1 PRIOR ART
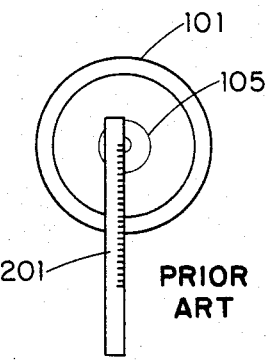
Fig. 2 PRIOR ART
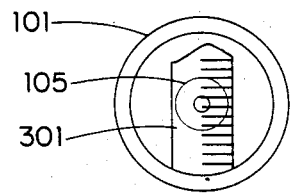
Fig. 3 PRIOR ART
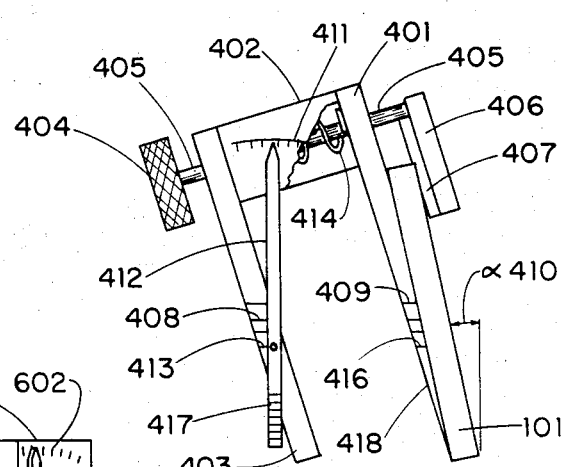
Fig. 4
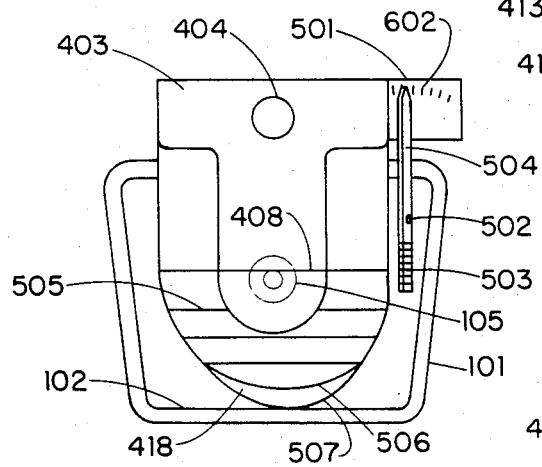
Fig. 5
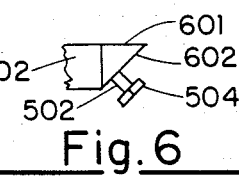
Fig. 6
Fig. 7

HEIGHT MEASUREMENT GAGE FOR MULTIFOCAL LENSES

FIELD AND BACKGROUND

This invention relates to measuring devices for lenses and, more particularly, to devices for accurately determining the height of the pupil from the lower lens recess edge of an eyeglass frame.

In order to properly fit multifocal glasses, it is necessary to measure the distance from the lower inside edge of the frame to the center of the pupil as illustrated in FIG. 1. This figure includes a frame 101, a lower inside edge of the frame 102, an eye pupil 105 with its center at 103 and a distance d (104) from the lower inside edge of the frame to the center of the pupil. Where there is no lower frame this measurement is understood as being made from the lower edge of the lens.

This measurement is currently accomplished by merely placing a millimeter scale against the frame and making a rough estimate of the center of the pupil. Such an approach is illustrated in FIG. 2. This Figure shows the frame 101, the pupil 105 and a millimeter scale 201 with the scale in position to make the pupil height measurement. Measurements of this sort are subject to a number of errors caused by such factors as nonhorizontal alignment between the operator's or optician's eye and that of the patient, and improper measurement of both the lower edge of the frame and the center of the pupil due to parallax.

Some improvement is provided by a clear plastic gage which is designed to be positioned with its lower edge resting on the lower edge of the frame as shown in FIG. 3 to eliminate alignment or parallax errors for the pupil.

SUMMARY

The present invention comprises two parallel clear plastic plates containing alignment marks which when aligned with the optician's eye properly position the optician to read to distance of the pupil above the lower frame and thereby eliminate alignment and parallax errors. The error encountered in measuring the position of the lower frame is eliminated by positioning the lower edge of the gage directly on the frame or where there is no frame by clamping the invention with its lower edge aligned with the lower edge of the lens. The angle of the lenses away from the vertical is determined by an integral angle gage, enabling the optician to easily select the correct alignment marks for each lens.

BRIEF DESCRIPTION OF THE DRAWINGS

FIG. 1 is a frontal view of a pair of glasses illustrating the position of the pupil with respect to the frame.

FIG. 2 illustrates a method of measuring the position of the pupil using a conventional opaque scale.

FIG. 3 illustrates a method of measuring the position of the pupil using a clear scale.

FIG. 4 is a side view of the present invention illustrating its use with a pair of glasses having its frame and lenses positioned at an angle with respect to the vertical.

FIG. 5 is a front view of the present invention illustrating the use of an integral angle measurement and amplification gage.

FIG. 6 is a top view of the angle amplification gage.

FIG. 7 is a top view of a nonamplifying angle gage.

DETAILED DESCRIPTION OF THE INVENTION

Referring to FIG. 4, the invention is shown to comprise a rear plate 401 of clear plastic, a front plate 403 of clear plastic spaced apart by spacer 402. Passing through the spacer is shaft 405 which includes a knob 404 on one end and a clamp 406 (formed of a third plate) on its opposite end. A felt strip 407 is secured to the inside face of the clamp and rests against the top of eyeglass frame 101. Within the spacer is a retaining spring 414 connected to the spacer and the shaft 405 to urge the clamp against the frame and thereby hold the device in position on the frame while measurements are being made.

The front and rear plates are maintained generally parallel by the spacer. Each plate contains sets of alignment marks such as marks 408 on the front plate and 409 on the rear plate. These marks are positioned to horizontally align the optician's line of sight, compensating for the frame's offset from the vertical as indicated by angle alpha 410. One set of marks is generally selected to provide compensation for the most typical value offset angle, which is eleven degrees. Additional alignment marks such as marks 415 and 416 of different color or lengths for identification purposes are included to accommodate other angles of alpha, as required. These angles may be measured by an integral angle gage described below.

FIG. 5 is a front view of the invention and shows the alignment marks in the aligned position. The height of the center of the pupil above the lower frame is then read directly from a height gage formed of graduations 505 located on the rear plate.

Newer models of frames have alpha angles which vary considerably from the typical value of eleven degrees, complicating the measurement because the optician must now determine the value of alpha and the correct set of alignment marks to be used prior to making the measurement of the pupil height. The present invention includes an integral angle gage which directly measures the value of alpha and can be used for alignment almost simultaneously with the measurement of pupil height.

A first embodiment of this gage is shown in FIG. 4 and comprises an angle gage 411, an indicator 412, an indicator shaft 413 and a weight 417 for the lower portion of the indicator. A top view of this gage is shown in FIG. 7. The plate 403 supports the shaft 413 which in turn rotatably supports the indicator 402. In the operation of this gage, the weighted lower end of the indicator 417 maintains the indicator positioned vertically, regardless of the angle alpha to which the frame is set. As alpha increases from zero degrees, the upper tip of the indicator moves across the face of the scale 411 which is calibrated in degrees and consequently provides a direct means of reading alpha. The scale is placed directly on the side face of the spacer 402.

To use the present invention, the optician needs to merely follow a few simple steps which include placing the frame on the patient, placing the invention on the frame viewing the side of the spacer, reading the value of alpha, selecting the correct alignment lines in accordance with the value of alpha, and then reading the correct height of the pupil from the graduations 504 on the rear plate 409.

Inserting the lower edge 507 of the rear plate 401 into the lower lens recess in the frame is simplified because the lower edge is formed with a sharply curved periphery and the face is tapered. The tapered face 418 is shown as beginning at taper contour line 506 in FIG. 5 and continuing to the lower edge of the back plate to provide a relatively thin surface which easily fits into the lens recess in the lower portion of the frame.

The measurement procedure is made even more rapid by the alpha gage shown in FIGS. 5 and 6. In FIG. 6, it can be seen that the spacer includes a wedge shaped projection 601, containing an expanded alpha scale 602 on its forward face. An indicator shaft 502 is mounted on and orthogonal to the face of the wedge shaped projection 601. Shaft 502 rotationally supports indicator 504. In the operation of this gage, the indicator tip must travel further across the scale 602 for the same value of alpha because only a fraction of the travel serves to move the indicator in the direction necessary to maintain the indicator vertical. Consequently, there is an amplification in the reading of alpha on the expanded alpha scale providing a more accurate determination of alpha. In addition, the value of alpha can be read from the front of the glasses, making it possible for the optician to simply glance up at the alpha scale and then align his eye to read the pupil height.

Although one specific embodiment and two variations of the present invention have been described, other variations which incorporate the broad principals of the invention are possible and are considered to fall within the scope of the invention. For example, the indicator for the alpha gage may be pivoted at its top and function in the manner of a normal pendulum, providing a reading of alpha on a gage located at the lower tip of the indicator.

The arm or pendulum type indicator may be entirely replaced by other vertical indicating devices such as a bubble indicator in which the vertical is indicated by the position of a bubble trapped with a liquid. The liquid is contained in an archshaped chamber about which an alpha scale is drawn. The position of the bubble along the arch provides an indication of the value of alpha in a manner similar to that provided by the arm or pendulum indicator.

Having described my invention, I claim:

1. Apparatus for accurately measuring the height of the pupil above the lower frame of eyeglasses of the type containing lenses and having a frame about the periphery of the lenses, comprising:

(a) a first transparent plate having a lower edge which is positioned to rest on the lower frame of the eyeglasses, the first transparent plate also being positioned generally parallel to the position of the eyeglass lens when later installed, (b) a second transparent plate positioned generally parallel to the first plate and adjacent thereto, but separated therefrom and the second transparent plate being positioned forward of the first plate and frame, which is in a direction away from the pupil to be measured, (c) spacer means for supporting and spacing the first and second transparent plates apart, while maintaining their generally parallel position with respect to one another, (d) a generally vertically oriented scale means located on the first transparent plate for determining the heights of the pupil above the lower portion of the eyeglass frame, (e) alignment means on the first and second transparent plates to align the eye of the operator taking the measurement in a horizontal plane passing through an area about the center of the pupil to be measured, and (f) clamp means for securing said apparatus to the glasses by detachably clamping the two together, said clamp means comprising:

(1) a first shaft passing through and rotatable within said spacer means in a direction orthogonal to the frame and lenses of the glasses, (2) a third plate connected to the first shaft at the end adjacent the glasses and positioned to be rotated with the shaft to fall behind the lens and adjacent to the pupil to be measured to hold said apparatus to the glasses by means of said third plate, (3) a spring means located within said spacer means, said spring means being connected to said first shaft and said spacer means to urge said third plate against the frame and lenses and thereby secure said apparatus to the glasses, and (4) a knob connected to the first shaft on the end opposite the third plate to facilitate manual rotation of the third plate by means of the shaft, rotation of the third plate in a direction away from the frame and lens releasing said apparatus from the glases, while rotation towards and behind the frame secures said apparatus to the frame of the glasses.

* * * * *